US010156835B2

(12) United States Patent
Bobker et al.

(10) Patent No.: US 10,156,835 B2
(45) Date of Patent: Dec. 18, 2018

(54) METHOD FOR IDENTIFYING SHORTCOMING IN A BUILDING AUTOMATION SYSTEM (BAS)

(71) Applicant: Research Foundation of the City University of New York, New York, NY (US)

(72) Inventors: Michael Bobker, New York, NY (US); Honey Berk, New York, NY (US); Marco Ascazubi, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 329 days.

(21) Appl. No.: 14/962,443

(22) Filed: Dec. 8, 2015

(65) Prior Publication Data

US 2016/0161928 A1 Jun. 9, 2016

Related U.S. Application Data

(60) Provisional application No. 62/088,817, filed on Dec. 8, 2014, provisional application No. 62/190,289, filed on Jul. 9, 2015.

(51) Int. Cl.
G05B 15/02 (2006.01)

(52) U.S. Cl.
CPC ...... *G05B 15/02* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 2010/0283606 | A1* | 11/2010 | Tsypin | G06Q 30/02 340/540 |
| 2010/0286937 | A1* | 11/2010 | Hedley | G06Q 30/02 702/60 |
| 2016/0062332 | A1* | 3/2016 | Call | G05B 19/042 700/276 |
| 2016/0153677 | A9* | 6/2016 | Dempster | F24F 11/0009 700/276 |
| 2016/0320758 | A1* | 11/2016 | Park | G05B 15/02 |
| 2016/0366910 | A1* | 12/2016 | Kirchinger | A23K 40/20 |
| 2017/0031962 | A1* | 2/2017 | Turney | G05B 15/02 |

* cited by examiner

*Primary Examiner* — Asok K Sarkar
(74) *Attorney, Agent, or Firm* — Peter J. Mikesell; Schmeiser, Olsen & Watts, LLP

(57) ABSTRACT

A Building Automation System Assessment Tool (BASAT) is provided. The BASAT receives input from a user that identifies the points associated with building systems controlled by Building Automation System (BAS) at a facility being surveyed. Based on the identified points, output reports are provided that identify shortcomings in the current BAS.

14 Claims, 21 Drawing Sheets

| GENERAL BUILDING DETAILS | 206 | 208 | 210 |

| BUILDING INFORMATION | |
|---|---|
| Building Name | |
| Building Address | |
| Building Type | |
| Demand Response Provider | |
| Description | |

| SURVEYOR INFORMATION | |
|---|---|
| Name | |
| Company | |
| Contact Phone Number | |
| Contact Email Address | |
| Visit Date | |

| CONTROL SYSTEM INFORMATION | |
|---|---|
| Manufacturer | |
| Software/Version/Protocol | |
| Year Installed | |
| Installer | |
| Trending Capability | |

FIG. 2B

| AHU | GENERATE RESULT | RESET |

| TEMPERATURES | | |
|---|---|---|
| Mixed Air Temperature | ○ Yes | ● No |
| Supply Air Temperature | ○ Yes | ● No |
| Supply Air Temperature Setpoint | ○ Yes | ● No |
| Exhaust Air Temperature | ○ Yes | ● No |
| Return Air Temperature | ○ Yes | ● No |
| Supply Air Relative Humidity | ○ Yes | ● No |

| FANS | | |
|---|---|---|
| Supply Fan Speed | ○ Yes | ● No |
| Supply Fan Current | ○ Yes | ● No |
| Supply Fan Status | ○ Yes | ● No |
| Return Fan Speed | ○ Yes | ● No |
| Return Fan Current | ○ Yes | ● No |
| Return Fan Status | ○ Yes | ● No |
| Exhaust Air Fan Status | ○ Yes | ● No |
| Duct Static Pressure | ○ Yes | ● No |
| Duct Static Pressure Setpoint | ○ Yes | ● No |
| Air Volume | ○ Yes | ● No |

Notes

FIG. 5B

| COOLING PLANT | GENERATE RESULT | RESET |

| CHILLER(S) | | |
|---|---|---|
| Chiller Status | ○ Yes | ● No |
| Chiller Run Command | ○ Yes | ● No |
| Chiller Power | ○ Yes | ● No |
| Chiller Part Load Fraction | ○ Yes | ● No |
| Chiller Amps | ○ Yes | ● No |
| Cooling Plant Load | ○ Yes | ● No |
| Cooling Plant Part Load Ratio | ○ Yes | ● No |
| Cooling Demand | ○ Yes | ● No |

| CHILLED WATER LOOP | | |
|---|---|---|
| Chilled Water Supply Temp. | ○ Yes | ● No |
| Chilled Water Supply Temp. Setpoint | ○ Yes | ● No |
| Chilled Water Return Temp. | ○ Yes | ● No |
| Chilled Water Flow | ○ Yes | ● No |
| Chilled Water Flow Setpoint | ○ Yes | ● No |
| Chilled Water Flow Ratio | ○ Yes | ● No |
| Chilled Water Loop Differential Pressure | ○ Yes | ● No |
| Total Plant Design CHW Flow | ● Yes | ○ No |

Notes

FIG. 5C

| HEATING PLANT | GENERATE RESULT | RESET |

| HOT WATER LOOP | | |
|---|---|---|
| Hot Water Return Temperature | ○ Yes | ⊙ No |
| Hot Water Supply Temperature | ○ Yes | ⊙ No |
| Hot Water Supply Temperature Setpoint | ○ Yes | ⊙ No |
| Hot Water Loop Differential Pressure | ○ Yes | ⊙ No |
| Hot Water Loop Differential Pressure Setpoint | ○ Yes | ⊙ No |
| Hot Water Loop Bypass | ○ Yes | ⊙ No |
| Hot Water Delta-T (Supply-Return) | ○ Yes | ⊙ No |

| PRIMARY HOT WATER PUMPS | | |
|---|---|---|
| Primary Hot Water Pump Current | ○ Yes | ⊙ No |
| Primary Hot Water Pump Power Consumption | ○ Yes | ⊙ No |
| Primary Hot Water Pump Speed | ○ Yes | ⊙ No |
| Primary Hot Water Pump Frequency | ○ Yes | ⊙ No |
| Primary Hot Water Pump Inlet Pressure | ○ Yes | ⊙ No |
| Primary Hot Water Pump Outlet Pressure | ○ Yes | ⊙ No |
| Primary Hot Water Pump Flow Rate | ○ Yes | ⊙ No |
| Primary Hot Water Pump Feedback | ○ Yes | ⊙ No |
| Primary Hot Water Pump Speed Control | ○ Yes | ⊙ No |
| Primary Hot Water Pump Status | ○ Yes | ⊙ No |

Notes

FIG. 5D

AHU REPORT

[ Update ]  [ Reset ]

| POSSIBLE AHU CAPABILITIES | Available? | Additional data needed: | Notes: |
|---|---|---|---|
| Determine the Outside Air Fraction | Yes | | |
| Determine if outside air conditions are favorable for Economizer mode | No | Chilled Water Coil Valve Position; Mixed Air Temperature; Outside Air Damper Position; Outdoor Air Temperature; Return Air Temperature | |
| Detect Cooling Coil operation during Economizer mode | No | Chilled Water Coil Valve Position; Outside Air Damper Position; Outdoor Air Temperature; Return Air Temperature; Supply Air Temperature Setpoint | |

| COOLING PLANT | Update | Reset | | |
|---|---|---|---|---|
| POSSIBLE CHILLER FAULT DETECTION ANALYTICS | Available? | Additional data needed: | Notes: |
| Chilled water supply temperature not tracking setpoint | No | Chilled Water Supply Temp.; Chilled Water Supply Temp. Setpoint | |
| Chiller outlet temperature is not tracking setpoint | No | Evaporator Outlet Water Temp.; Evaporator Outlet Water Temp. Setpoint | |
| Chilled water supply temperature not following outdoor air reset schedule | No | Chilled Water Supply Temp.; Chilled Water Supply Temp. Setpoint; Outdoor Air Temperature | |
| Chilled water differential pressure not tracking setpoint | No | Chilled Water Loop Differential Pressure; Chilled Water Loop Differential Pressure Setpoint | |
| Chilled water flow not tracking setpoint | No | Chilled Water Flow; Chilled Water Flow Setpoint | |
| Chiller refrigerant pressure out of manufacturer range | No | Data to indicate chiller is on (status, amps, run, etc); Condenser Refrigerant Pressure; Evaporator Refrigerant Pressure | |

| HEATING PLANT | | | |
|---|---|---|---|
| Update | Reset | | |

| POSSIBLE HEATING PLANT CAPABILITIES | Available? | Additional data needed | Notes: |
|---|---|---|---|
| Verify if reset is or can be established on hot water supply temperature | | | |
| Detection of low Delta-T (less than 8°F) | | | |
| Determine if hot water loop differential pressure is constant and if it can be reset at partial load conditions | | | |
| Diagnose boiler system leakage | | | |
| Determine if excess boiler capacity online, with associated efficiency losses (boiler sequencing) | | | |
| Verify steam trap performance | | | |
| Diagnose tube cleanliness (predictive maintenance) or over-firing | | | |
| Diagnose boiler efficiency | | | |

FIG. 6D

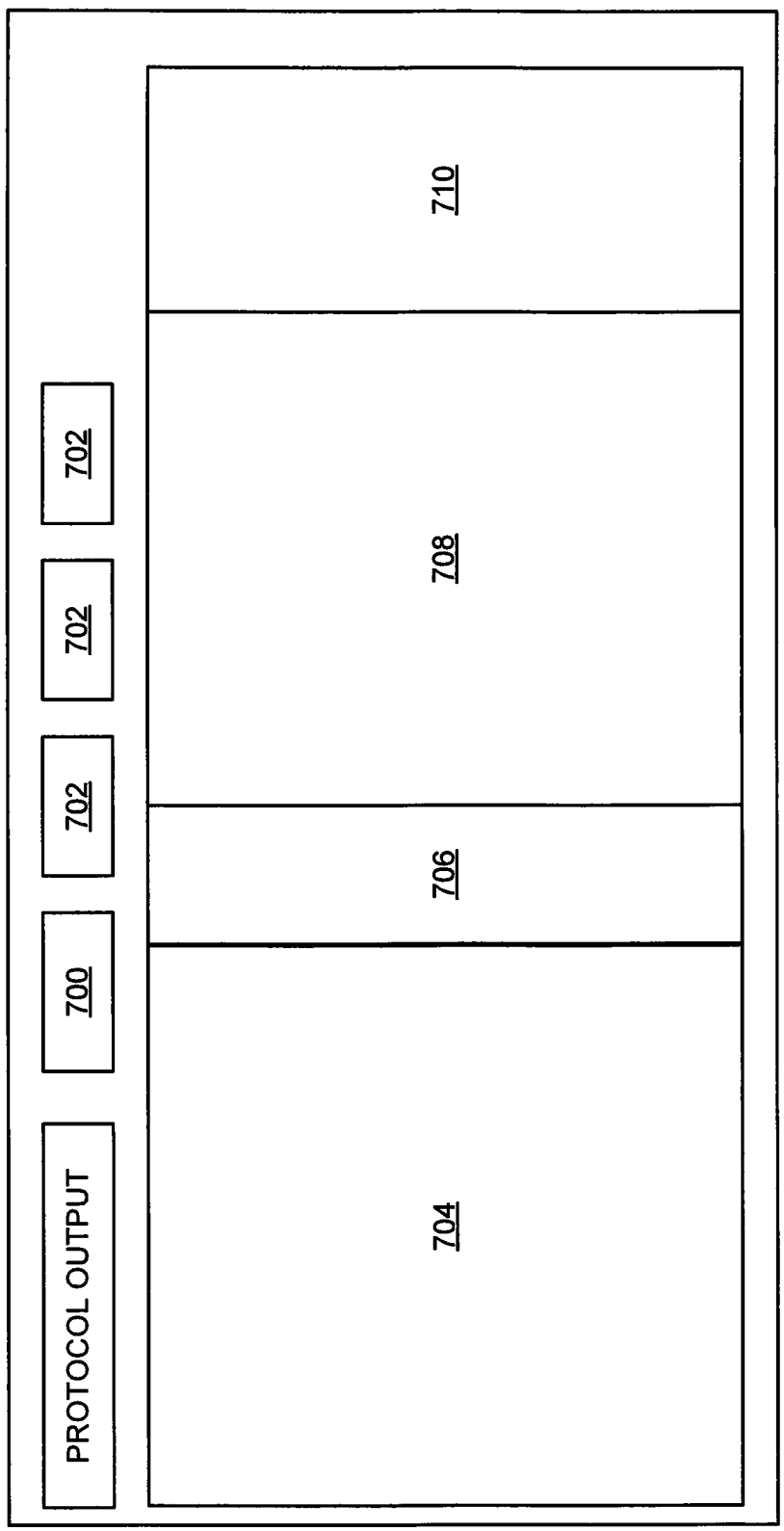

| LEAN Protocol Output | Generated Results | Heating | Cooling | AHU |

| | Possible Capabilities | Available? | Additional data: | Notes: |
|---|---|---|---|---|
| Temperature Control | Determine whether Supply air temperature tracks Setpoint | | | |
| | Detect Cooling Oil operation during Economizer mode | | | |
| | Detect overlap of outside-air temperature lockout setpoints for heating and cooling | | | |
| | Determine if significant reheating occurs at the interior zones during unoccupied hours | | | |

| | Possible Capabilities | Available? | Additional data: | Notes: |
|---|---|---|---|---|
| Operating Schedules | Implement a Discharge-Air | | | |
| | Implement a night setback during unoccupied hours | | | |
| | Implementation of nighttime setback/unoccupied mode at the zone level | | | |
| | Determine if supply fan cycling occurs frequently during unoccupied hours | | | |
| | Verify outside-air damper operation during unoccupied hours | | | |

FIG. 7B

| LL87 Protocol Output | Generated Results | Heating | Cooling | AHU |

| | Possible Capabilities | Available? | Additional data: | Notes: |
|---|---|---|---|---|
| Temperature Humidity Setpoints and Setbacks | Implement a Discharge-Air Setpoint reset schedule | | | |
| | Determine whether Supply Air Temperature tracks Setpoint | | | |
| | Identify extremely high or low Supply Air temperatures and setpoints | | | |
| | Verify stability of Discharge-Air temperatures | | | |

| | Possible Capabilities | Available? | Additional data: | Notes: |
|---|---|---|---|---|
| Operating Schedules | Implement a night setback during unoccupied hours | | | |
| | Implementation of Nighttime setback/unoccupied mode at the zone level | | | |
| | Determine if supply fan cycling occurs frequently during unoccupied hours | | | |
| | Verify proper outdoor-air damper operation during unoccupied hours or when the building is in warmup/cool-down mode | | | |
| | Verify outside-air damper operation during unoccupied hours | | | |

FIG. 7C

| | BRT Protocol Output | Generated Results | Heating | Cooling | AHU |
|---|---|---|---|---|---|

| | Possible Capabilities | Available? | Additional data: | Notes: |
|---|---|---|---|---|
| AHU Discharge Control | Is reset being used to control the discharge-air set point? | | | |
| | Is the discharge-air meeting set point or do deviations occur? | | | |
| | Are set points too high or too low; discharge-air temperature too warm or too cold? | | | |
| | Verify stability of Discharge-Air temperatures | | | |

| | Possible Capabilities | Available? | Additional data: | Notes: |
|---|---|---|---|---|
| AHU heating and cooling Control | Are outdoor air temperature lockout set points for heating and cooling reasonable, do they overlap? | | | |
| | Is there simultaneous heating and cooling occurring in the AHU? | | | |

| | Possible Capabilities | Available? | Additional data: | Notes: |
|---|---|---|---|---|
| AHU MIN Outdoor-Air operation | Is outdoor air sufficient for ventilation or is over-ventilation occurring? | | | |
| | Does the outdoor-air damper close during unoccupied times? | | | |

FIG. 7D

| DR Protocol Output | Generated Results | Heating | Cooling | AHU |

| Possible Capabilities | Available? | Additional data: | Notes: |
|---|---|---|---|
| Increase/decrease Global or Zone temperature setpoints | No | Chilled water oil valve position | |
| Decrase Duct static pressure | No | Duct Static Pressure | |
| Limit or decrase fan variable frequency drive (VFD) speed | Yes | | |
| Increase/decrease supply air temperature setpoints | No | Outdoor air temperature, Supply Air Temperature | |
| Reduce quantity of fans in operation | Yes | | |
| Heating/Cooling valve position limiting/shutoff | No | Chilled water oil valve position Setpoint | |

FIG. 7E

| DR | GENERATE RESULT | RESET |

| HVAC SYSTEM | | |
|---|---|---|
| DX Unit Temperature Setpoint | ☐ Yes | ☒ No |
| DX Unit Status Control | ☐ Yes | ☒ No |
| Supply Fan Speed Control | ☐ Yes | ☒ No |

| LIGHTING SYSTEM | | |
|---|---|---|
| Light Fixture Control | ☐ Yes | ☒ No |
| Dimmable Ballasts | ☐ Yes | ☒ No |

| DR LEVEL | | |
|---|---|---|
| Auto Demand Response Signal | ☐ Yes | ☒ No |
| Pre-Programmed DR Strategy | ☐ Yes | ☒ No |
| Demand Response Enable | ☐ Yes | ☒ No |
| DR Event Notification | ☐ Yes | ☒ No |
| Direct Load Control Commands | ☐ Yes | ☒ No |
| Whole Building kW Demand | ☐ Yes | ☒ No |

Notes

Generate Results

814

816

Current Protocol: BRT | # points are needed to satisfy all protocols

Most needed:

Most needed overall:

|  |  | Number of Measures Requiring the Point |  |  |  |  | Point |
|---|---|---|---|---|---|---|---|
| Point | Section | BRT | LL87 | LEAN | DR | TOTAL | Status |
| 802 | 810 | 805 | 806 | 807 | 808 | 809 | 804 |
| Point 1 | Sect. 1 |  |  |  |  |  |  |
| . . . Point n | . . . Sect. n | # | # | # | # | # | t/f |

FIG. 8

METHOD FOR IDENTIFYING SHORTCOMING IN A BUILDING AUTOMATION SYSTEM (BAS)

CROSS-REFERENCE TO RELATED APPLICATIONS

This application claims priority to and is a non-provisional of U.S. Patent Application Ser. Nos. 62/088,817 (filed Dec. 8, 2014) and 62/190,289 (filed Jul. 9, 2015), the entirety of each of which is incorporated herein by reference.

BACKGROUND OF THE INVENTION

The subject matter disclosed herein relates to a building automation system (BAS). The rapid advancement of building automation devices coupled with the importance of improved environmental performance has led to an increasing number of BAS installations. The improvement of BAS over time has increased options for building owners and operators to improve occupant comfort, reduce operating expenses, and increase environmental performance. However, even as sophisticated building automation digital components and physical infrastructure continue to improve there remains a challenge of slow market adoption. One challenge of BAS implementation for many users appears to be high initial capital expense. Additionally, there appears to remain a level of owner uncertainty in decision-making about this rapidly evolving industry. Facility managers and building operators remain hesitant when adopting technology, which creates a rift in market support of the latest BAS technology. An improved tool for assisting current or potential owners and operators of a BAS is therefore desirable.

The discussion above is merely provided for general background information and is not intended to be used as an aid in determining the scope of the claimed subject matter.

BRIEF DESCRIPTION OF THE INVENTION

A Building Automation System Assessment Tool (BASAT) is provided. The BASAT receives input from a user that identifies the points associated with building systems controlled by a Building Automation System (BAS) at a facility being surveyed. Based on the identified points, output reports are provided that identify shortcomings in the current BAS. An advantage that may be realized in the practice of some disclosed embodiments of the process is that it provides a standardized tool that uniformly assesses the capabilities and deficiencies of a BAS relative to a predefined standard.

In a first embodiment, a method for identifying shortcomings in a building automation system (BAS) is provided. The method comprises steps of selecting a true or false value for each point in a list of predetermined points associated with a building system controlled by a building automation system, the building system being selected from the group consisting of an air handler unit building system, a cooling plant building system and a heating plant building system; comparing the selected true or false values to a list of capabilities and determining whether a capability in the list of capabilities is present or absent based upon predetermined combinations of the true or false values; and displaying the list of capabilities and showing a user a first indicator that is indicative of the presence or absence of the capability in the building automation system as determined during the step of comparing, thereby identifying shortcomings in the building automation system.

In a second embodiment, a method for identifying shortcomings in a building automation system (BAS) is provided. The method comprises steps of inputting text into a general building details form that provides general building details for a building with a building automation system; selecting a true or false value for each point from a list of points associated with an ambient environment of the building automation system, wherein the list of predetermined points associated with the ambient environment comprises capability to sense outdoor air temperature, sense outdoor relative humidity and outdoor air fraction; selecting a true or false value for each point in a list of predetermined points associated with a zone of the building automation system, wherein the list of predetermined points associated with the zone comprises capability to sense terminal unit damper position; sense terminal unit reheat valve position; sense zone temperature, sense zone temperature setpoint and sense occupancy mode; selecting a true or false value for each point in a list of predetermined points associated with a building system controlled by a building automation system, the building system being selected from the group consisting of an air handler unit building system, a cooling plant building system and a heating plant building system; comparing the selected true or false values to a list of capabilities and determining whether a capability in the list of capabilities is present or absent based upon predetermined combinations of the true or false values; and displaying the list of capabilities and showing a user a first indicator that is indicative of the presence or absence of the capability in the building automation system as determined during the step of comparing, thereby identifying shortcomings in the building automation system.

In a third embodiment, a method for identifying shortcomings in a building automation system (BAS) is provided. The method comprises steps of selecting a true or false value for each point in a list of predetermined points associated with an air handler building system controlled by a building automation system; selecting a true or false value for each point in a list of predetermined points associated with a cooling plant building system controlled by the building automation system; selecting a true or false value for each point in a list of predetermined points associated with a heating plant building system controlled by the building automation system; comparing the selected true or false values to a list of capabilities and determining whether a capability in the list of capabilities is present or absent based upon predetermined combinations of the true or false values; displaying the list of capabilities and showing a user a first indicator that is indicative of the presence or absence of the capability in the building automation system as determined during the step of comparing, thereby identifying shortcomings in the building automation system.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 2B is a specific example of an input form for entering general building information into a BASAT;

FIG. 5B is a specific example of an input form for entering points associated with an air handler unit;

FIG. 5C is a specific example of an input form for entering points associated with a cooling plant;

FIG. 5D is a specific example of an input form for entering points associated with a heating plant;

FIG. 6B is a specific example of an output report for an air handler unit as pertains to various capabilities related to that building system;

FIG. 6C is a specific example of an output report for a cooling plant as pertains to various related capabilities;

FIG. 6D is a specific example of an output report for a heating plant as pertains to various related capabilities;

FIG. 7A is a schematic depiction of an output report for a protocol;

FIG. 7B is a specific example of an output report for a LEAN Energy Analysis protocol;

FIG. 7C is a specific example of an output report for a NYC Local Law 87 protocol;

FIG. 7D is a specific example of an output report for a Building Re-tuning (BRT) protocol;

FIG. 7E is a specific example of an output report for a Demand Response (DR) protocol;

FIG. 7F is a specific example of an input form for entering points associated with a DR protocol; and FIG. 8 is a schematic depiction of an output report for a point status report.

DETAILED DESCRIPTION OF THE INVENTION

Figure 1:
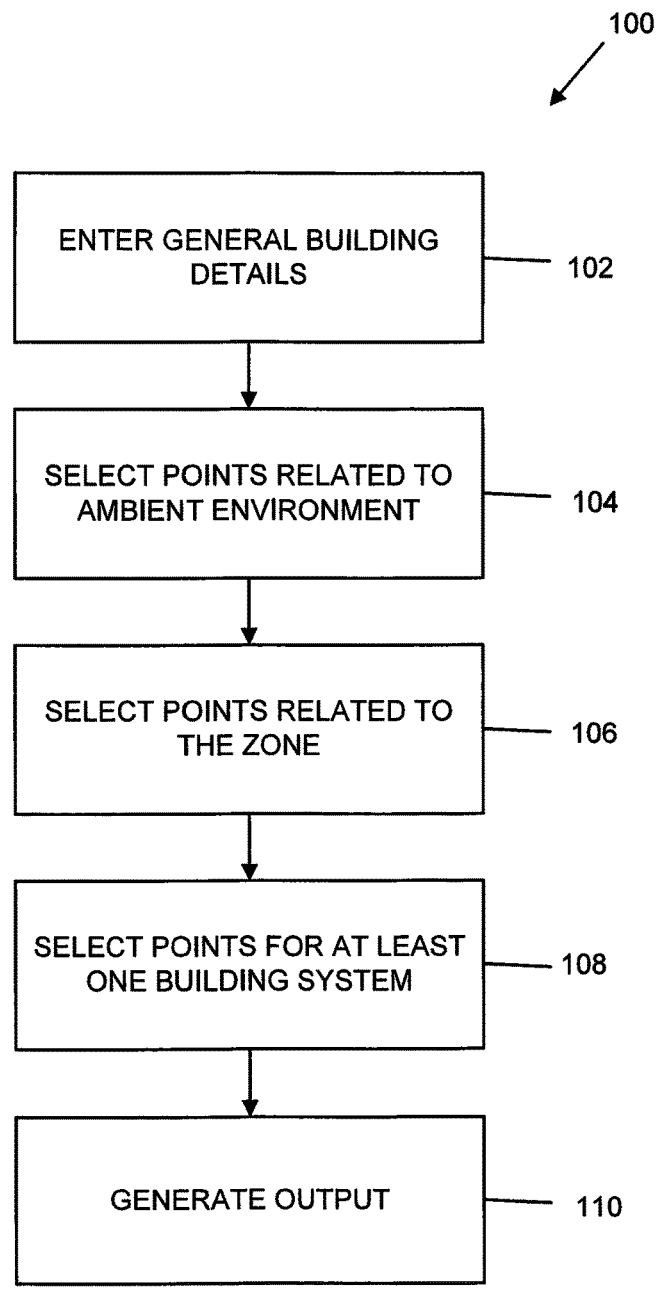
FIG. 1 is a flow diagram of a process of identifying shortcomings in a BAS.

This specification describes a Building Automation System Assessment Tool (BASAT) that provides a standardized approach to evaluating existing building systems relative to desired BAS functionality and performance goals. BASAT is a software tool that helps building owners, operators, consultants and contractors uniformly assess a BAS infrastructure and estimate what additional benefits can be gained from enhancing specific elements of their systems. The tool permits a user to evaluate existing commercial building infrastructure by assessing the capabilities of a BAS, and uses embedded logic to classify the availability of these capabilities based on specific combinations of points (sensors, actuators, etc.) found during a survey of the BAS. The tool enables building operators to adopt advanced capabilities that are available from the industry but are underutilized. In some cases, additional capabilities can be implemented by simple reprogramming of the existing BAS. In other cases, hardware additions or substantial system replacement (e.g. BAS upgrades, new sensors, new actuators) may be recommended to enable implementation of desired fault detection diagnostic algorithms or control strategies. In one embodiment, the disclosed tool is included in typical free "walkthrough" evaluations of BAS infrastructure that are often provided by consultants and vendors before they commit to more in-depth and project-specific evaluations. The output from BASAT can spur further investigation into promising BAS enhancement recommendations and provide a basis for uniformly assessing BAS infrastructure across building portfolios.

The term "measures" is a term of art that refers to a functionality, an action or a condition that can be implemented or determined by reviewing the historical data from a set of points in a BAS. Measures are building capabilities (e.g. "Is the outdoor-air damper closed or at minimum position when outdoor conditions are favorable for economizing and the AHU is in cooling mode?") The term "capabilities" includes, but is not limited to, measures.

The term "points" is a term of art that refers to an input or output device that is used to control performance or building equipment or output devices related to building equipment. Examples of input devices include sensors (temperature sensors, pressure sensors, etc.), equipment status detectors (on/off sensor), and the like. Examples of output devices include devices that act based on an input device or instructions from the BAS (e.g. dampers, coils, switch gears, etc.). Outputs can also be the actions performed by equipment and devices in the BAS such as changes in equipment speed, position, etc.

BASAT may be used to evaluate the capabilities of a BAS in two ways: First, BASAT looks at the specific capabilities available to a BAS for a certain building facility. Second, BASAT determines the level of compliance with a specific protocol. These protocols include Building Re-tuning (BRT), Lean Energy Analysis (LEAN), Demand Response (DR), NYC Local Law 87 (LL87) and Fault Detection Diagnostics (FDD). In one embodiment, the BASAT is embodied as a spreadsheet comprising multiple workbooks. There is one such workbook for each building system and each protocol.

Figure 2A:
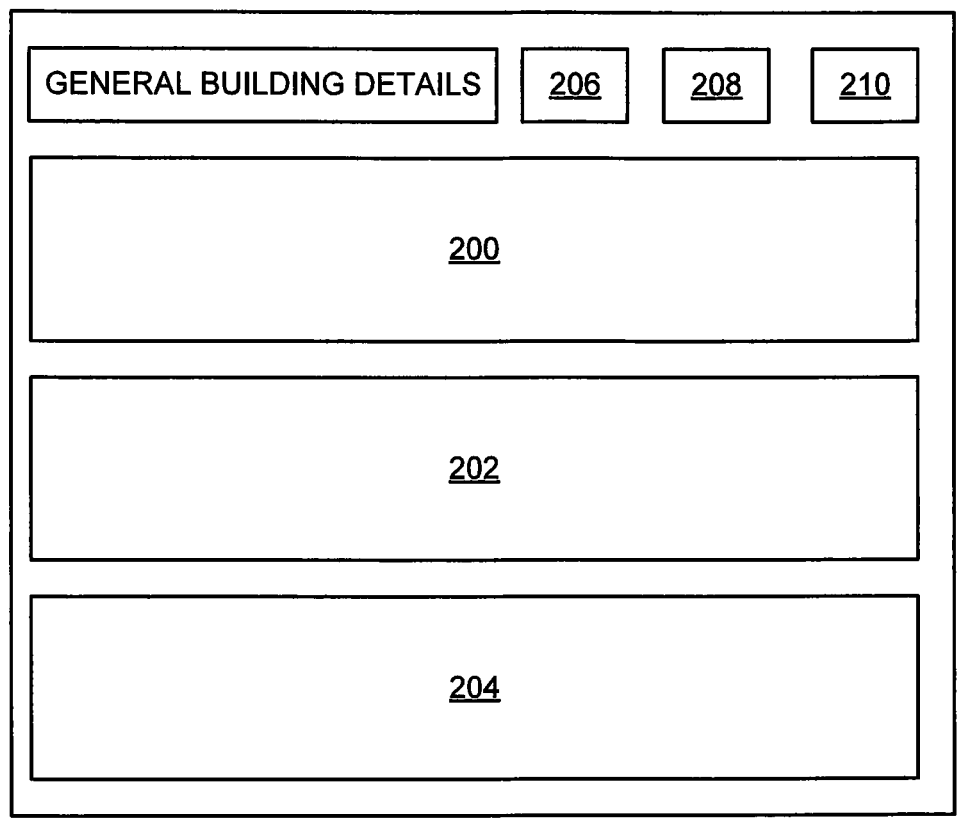
FIG. 2A is a schematic depiction of an input form for entering general building information into a Building Automation System Assessment Tool (BASAT)

As shown in FIG. 1, a method 100 is illustrated that begins with step 102 where a user is provided with a general building details form. This form permits the user to input details such as the building name, address, description and user information (contact information, date of visit, etc.) An example of a general building details form is provided in FIG. 2A (shown as a schematic) and FIG. 2B (shown as a specific example). As shown in FIG. 2A, the general building details form has locations for generalized information such as a building information section 200, a surveyor information section 202, and a control system information section 204. Digital buttons are also provided that clear information in the current form (clear button 206), clear the information in all forms (clear all button 208) or move to the next section while keeping the current data (next section button 210). Examples of input details include building information (building name, building address, building type, demand response provider, description), surveyor information (name, company, contact phone number, contact email address, visit date) and control system information (manufacturer, software/version/communication protocol, year installed, installer, and whether or not there is trending capability). For simplification of illustration, FIG. 2B illustrates only a select number of these points. Upon action of next section button 210 the user is presented with an ambient environment screen.

Figures 3A, 3B:
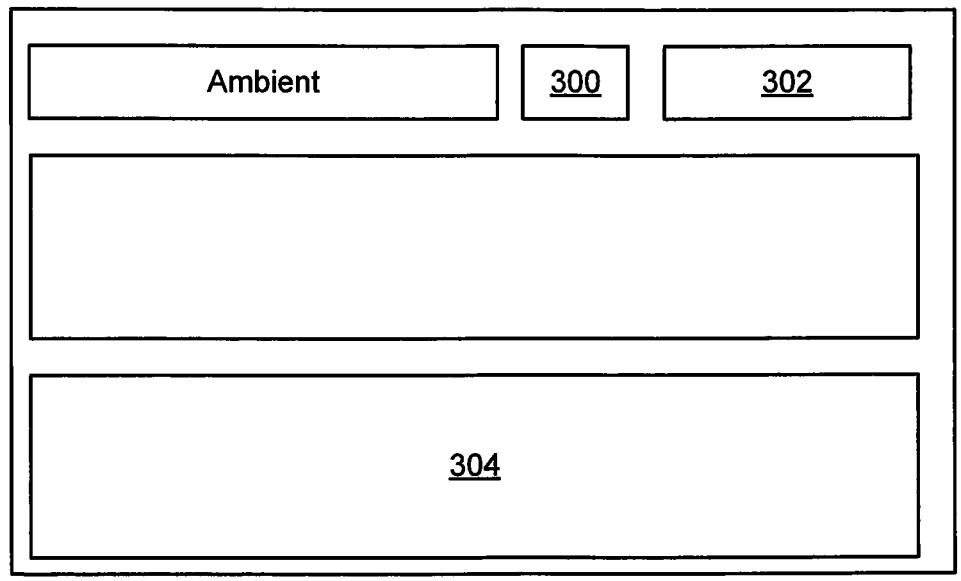
FIG. 3A is a schematic depiction of an input form for entering points associated with the ambient environment.
FIG. 3B is a specific example of an input form for entering points associated with the ambient environment.

In step 104 of method 100, the user is presented with a checklist of points associated with the ambient environment. An example of such a checklist is shown in FIG. 3A (shown as a schematic) FIG. 3B (shown as a specific example). Possible points for the ambient environment include, but are not limited to the ability of the BAS to sense outdoor air temperature, outdoor relative humidity and outdoor air fraction. Each point is identified with a true/false radio button that is selected by a user to indicate the availability of each point in the BAS. When the users selects the "true" setting, the point in the BAS is present and, in some cases, can be modified and trended. In one embodiment, the default setting is "false" and indicates the point is absent or disconnected from the BAS such that the point is not operable. In some embodiments, a note field is associated with each point where a user can create an annotation associated with the point. A clear button 302 clears data in the current form. A text box 304 is provided for the user to enter general notes associated with the ambient environment. Once the ambient capability checklist is completed, the user may advance to the zone checklist (step 106) by pressing a next section button 300.

Figures 4A, 4B:
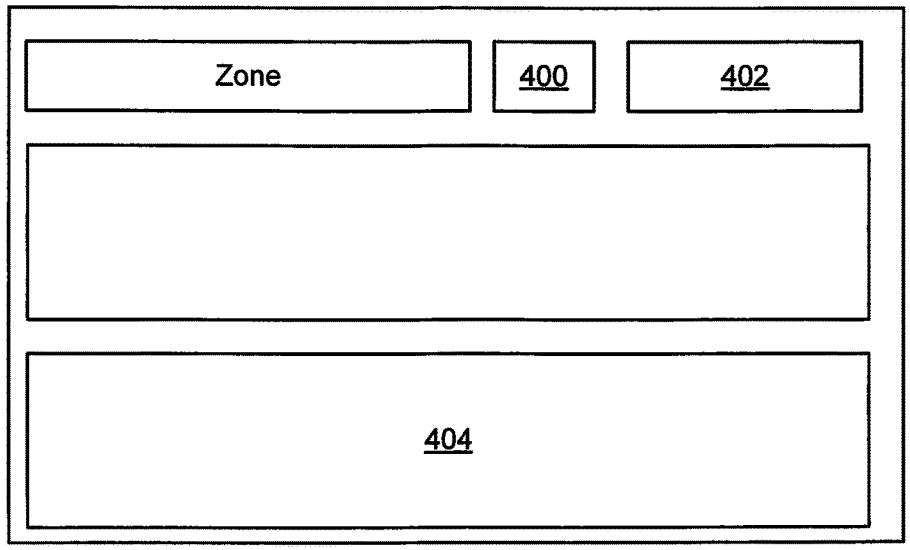
FIG. 4A is a schematic depiction of an input form for entering points associated with the zone.
FIG. 4B is a specific example of an input form for entering points associated with the zone.
Figure 4C:
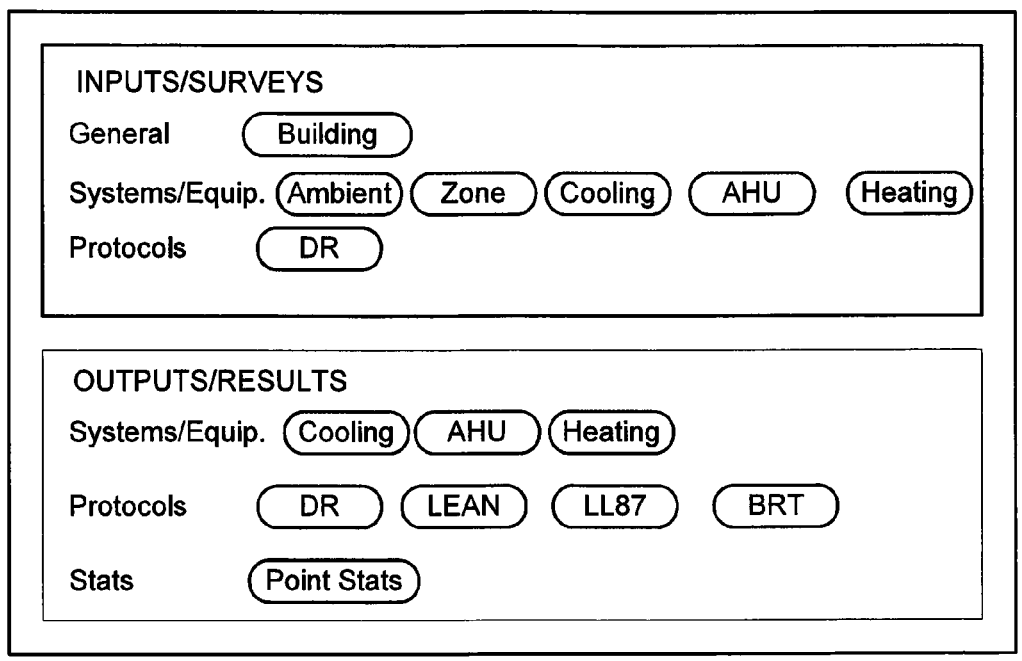
FIG. 4C is a schematic depiction of a menu for selecting different sections of the BASAT.

In step 106 of method 100, the user is presented with a checklist of points associated with the zone. An example of such a checklist is shown in FIG. 4A (shown as a schematic) and FIG. 4B (shown as a specific example). The checklist for the zone is substantially similar in form to the checklist for the ambient environment. Possible points for the zone include, but are not limited to, the ability to sense a terminal unit damper position, a terminal unit reheat valve position, a zone temperature, a zone temperature setpoint, and an occupancy mode. For simplification of illustration, FIG. 4B illustrates only a select number of these points. A clear button 402, a next section button 400 and a text box 404 for notes are also provided. Actuation of the next section button 400 takes the user to a menu screen where other sections can be selected. An example of a menu screen is shown in FIG. 4C. This permits the user to quickly assess the properties of a particular building system or protocol of interest. The sample menu of FIG. 4C categorizes options into inputs/surveys and outputs/results. The inputs/survey category comprises general, systems/equipment and protocol subcategories. The outputs/results category comprises systems/equipment, protocols and statistics subcategories. For example, the user may select the general button under the input category to be returned to step 102 to enter or alter general building information or the ambient, zone, cooling plant, air handler unit or heating plant button to be sent to the corresponding input screen and view a checklist of input options. Likewise, buttons to access the corresponding output reports are provided.

In step 108 of method 100, points are selected for at least one building system (e.g. an air handler building system, a cooling plant building system, a heating plant building system, etc.). Each of these points for a given building system are used in conjunction with the points selected for the ambient environment and/or zone to produce an output report for the corresponding building system. The output report can identify available capabilities and/or missing capabilities for each building system. If capabilities are missing, the output report can identify points that must be added to make the missing capability available.

Figure 5A:
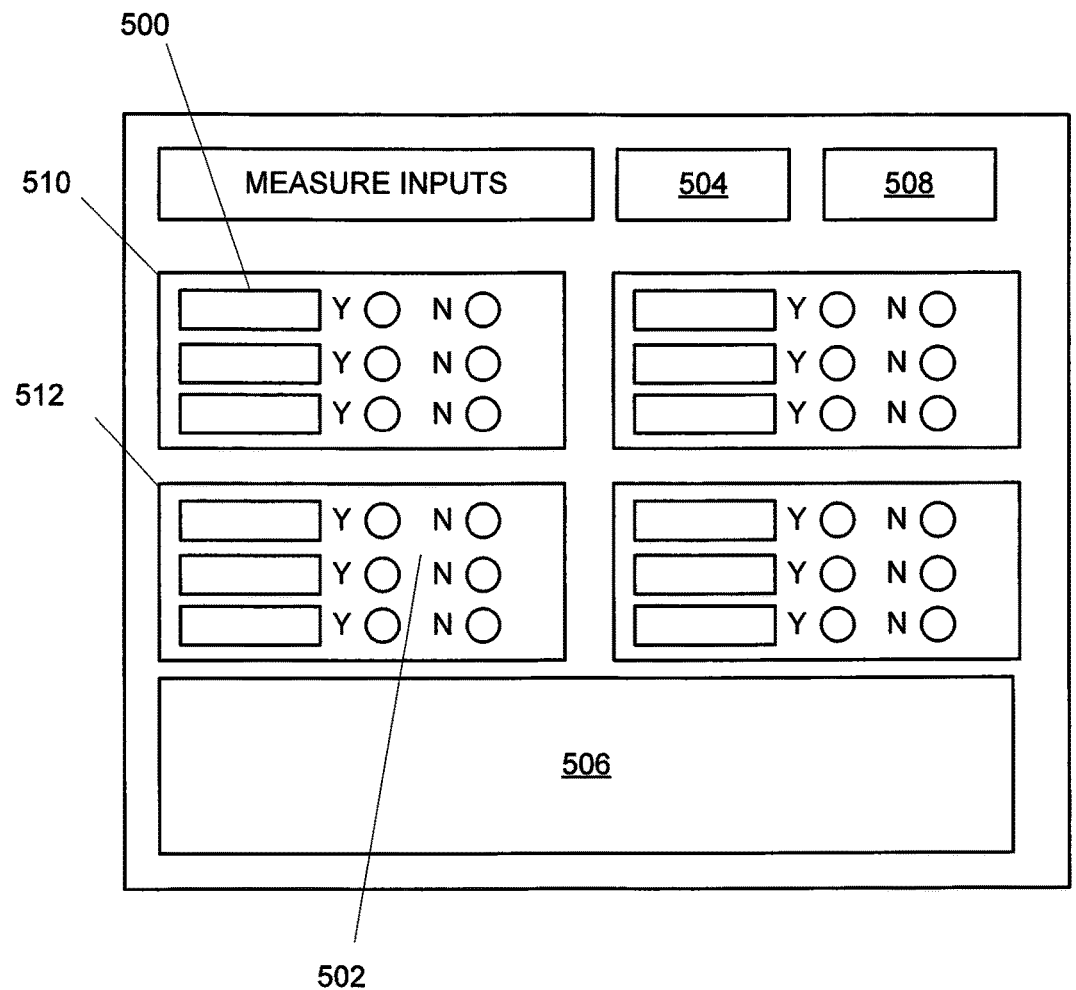
FIG. 5A is a schematic depiction of an input form for entering points associated with a building system

An example of a checklist of points for an air handler unit building system is provided in FIG. 5A (shown as a schematic that is generic for any capability) and FIG. 5B (shown as a specific example for a particular air handler unit building system). Generally, the checklists provide a list of points 500 with corresponding radio boxes 502, a clear button 504, a text box 506 for notes and a generate results button 508. The points 500 may be separated by subsystems (e.g. subsystem 510 and 512). Possible points for the air handler unit building system include, but are not limited to, temperature sensing (e.g. mixed air temperature, supply air temperature, supply air temperature setpoint, exhaust air temperature, return air temperature, supply air relative humidity); damper position sensing (e.g. outside air damper position, return air damper position, exhaust air damper position); fan sensors (supply fan speed, supply fan current, supply fan status, return fan speed, return fan status, exhaust air fan status, duct static pressure, duct static pressure setpoint, air volume); coils/valves sensors (chilled water coil valve position, chilled water coil valve position setpoint, heating coil valve position, heating coil valve position setpoint, re-heat coil valve position, pre-heat coil valve position, re-heat entering temperature, re-heat leaving temperature, pre-head entering temperature, pre-heat leaving temperature); and filter sensors (air filter pressure differential). For simplification of illustration, FIG. 5B illustrates only a select number of these points.

An example of a checklist of points for a cooling plant building system is provided in FIG. 5C (shown as a specific example). Possible points for the cooling plant building system include, but are not limited to, chiller properties (chiller status, chiller run command, chiller power, chiller part load fraction, chiller amps, cooling plant load, cooling plant part load ratio, cooling demand, evaporator inlet water temperature, evaporator outlet water temperature, evaporator outlet water temperature setpoint, evaporator water flow, evaporator differential water pressure, evaporator refrigerant temperature, evaporator refrigerant pressure, condenser inlet water temperature, condenser inlet water temperature setpoint, condenser outlet water temperature, condenser outlet water temperature setpoint, condenser water flow, condenser differential water pressure, condenser refrigerant temperature, condenser refrigerant pressure); chilled water loop properties (chilled water supply temperature, chilled water supply temperature setpoint, chilled water return temperature, chilled water flow, chilled water flow setpoint, chilled water flow ratio, chilled water loop differential pressure, chilled water loop differential pressure setpoint, total plant design chilled water flow); chilled water pump properties (chilled water pump status, chilled water pump run command, chilled water pump amps, chilled water pump speed); condenser water pump properties (condenser water pump status, condenser water pump run command, condenser water pump amps, condenser water pump speed); and cooling tower properties (cooling tower fan speed, cooling tower fan run-time, cooling tower fan power, cooling tower fan status). For simplification of illustration, FIG. 5C illustrates only a select number of these points.

An example of a checklist of points for a heating plant building system is provided in FIG. 5D (shown as a specific example). Possible points for the heating plant building system include, but are not limited to, boiler properties (boiler condensate return temperature, boiler supply temperature, boiler feed water temperature, boiler supply temperature setpoint, boiler status, boiler feed water flow, boiler make-up water, boiler fuel input, boiler gas flow rate, boiler feed water flow rate, boiler steam output, boiler steam flow rate, boiler steam pressure, boiler stack temperature, boiler outlet pressure, boiler input output efficiency, boiler combustion efficiency); heat exchanger properties (heat exchanger status, heat exchanger supply temperature, heat exchanger return temperature); hot water loop properties (hot water return temperature, hot water supply temperature, hot water supply temperature setpoint, hot water loop differential pressure, hot water loop different pressure setpoint, hot water loop bypass, hot water delta-T); and primary hot water pumps (primary hot water pump current, primary hot water pump power consumption, primary hot water pump speed, primary hot water pump frequency, primary hot water pump inlet pressure, primary hot water pump outlet pressure, primary hot water pump flow rate, primary hot water pump feedback; primary hot water pump speed control, primary hot water pump status). For simplification of illustration, FIG. 5D illustrates only a select number of these points.

In step 110 of method 100 a digital output is generated as an output spreadsheet upon actuation of a "generate result" digital button. There is one such digital button for each building system and each protocol. Upon actuation of the corresponding button, an output spreadsheet generates a report that is specific to the building system or protocol. This report provides a predetermined list of possible capabilities that are provided by BAS systems. Based on the user's previous input of the available points, the BASAT cross references known requirements for each capability to determine whether or not the capability is currently available to the facility. If the capability is not available, a list of missing points is provided.

Figure 6A:
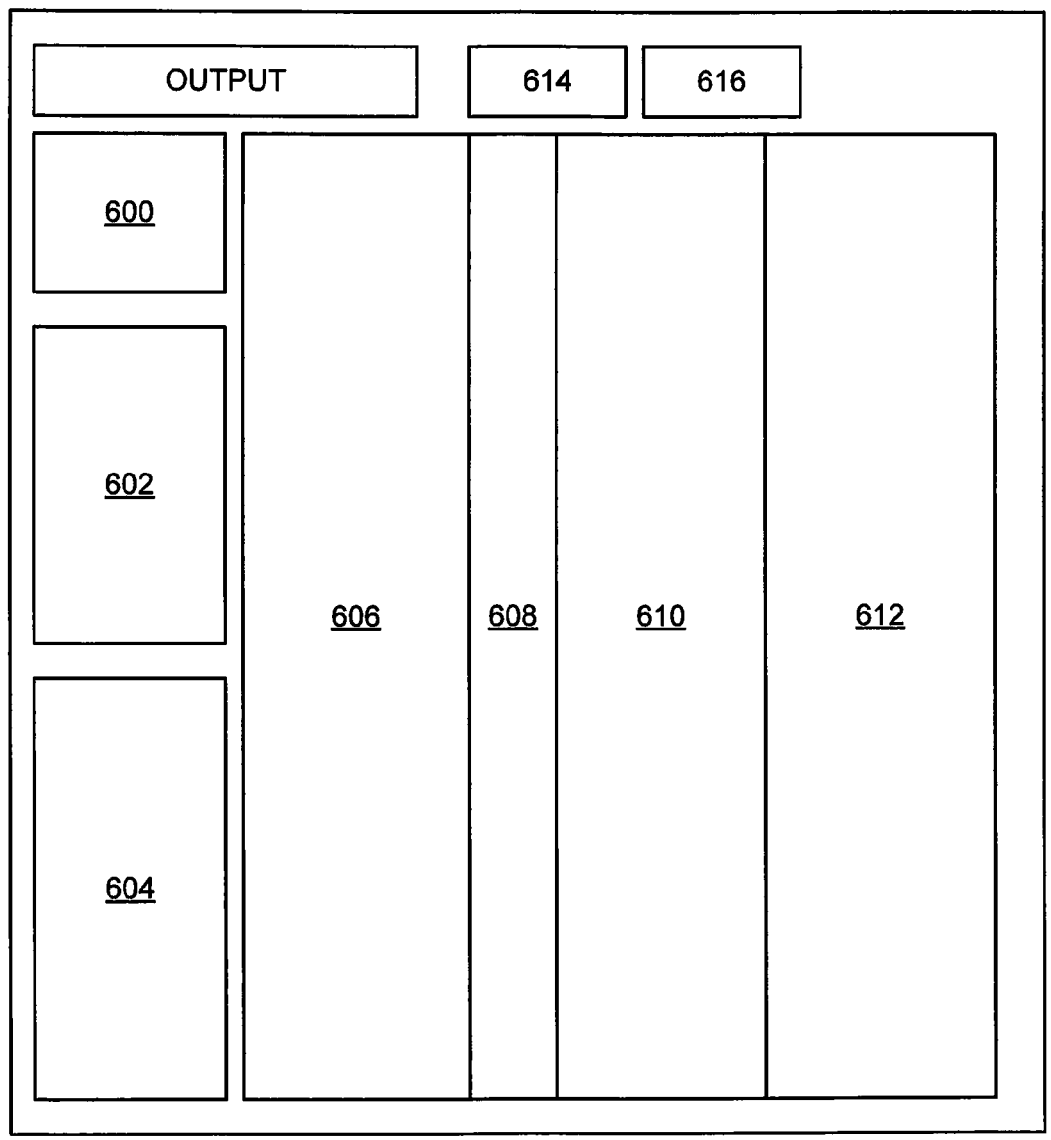
FIG. 6A is a schematic depiction of an output report for a building system.

An example of an output spreadsheet is provided in FIG. 6A (shown as a schematic) and FIG. 6B (shown as a specific example for an air handling unit building system). Section 600 presents building information that was provided in step 102. Section 602 presents a list of points that were identified as available while section 604 presents a list of points that were identified as unavailable. In some embodiments, these points are categorized according to their corresponding subsystem. Section 606 provides a predetermined list of possible capabilities that may be provided by a particular building system. Section 608 provides a yes/no indication to signify whether or not the capability is currently available. The determination as to whether or not the capability is currently available is automatically made using computer implementation based on the user's input of points into the corresponding checklist (e.g. FIG. 5B) and the ambient environment and/or zone checklists. If the capability is not available, a list of missing points is provided in column 610 to indicate what points should be added to render the capability available. Column 612 provides a space for notes to be added, either by the user or automatically generated by BASAT. Update data button 614 and reset defaults button 616 are also provided.

The specific example provided in FIG. 6B shows an output spreadsheet for an air handler unit system. Boxes 600, 602 and 604 are omitted from the specific examples shown in the output figures for simplicity of illustration. In the example of FIG. 6B, the predetermined list of possible capabilities includes the capability to determine the outside air fraction, determine if outside air conditions are favorable for economizer mode, detect cooling coil operation during economizer mode, detect deficiencies in economizer mode operation, implement a discharge-air setpoint reset schedule, determine whether supply air temperature tracks setpoint, determine if sufficient/excessive outside air is being supplied for ventilation; verify outside-air damper operation during unoccupied hours; verify static pressure control; determine if minimum outside-air damper position signal is reasonable; detect whether outside-air damper is open when outside-air conditions are unfavorable; implement a night setback during unoccupied hours; implementation of nighttime setback/ unoccupied mode at the zone level; determine if supply fan cycling occurs frequently during unoccupied hours; determine if significant reheating occurs at the interior zones during unoccupied hours; detect overlap of outside-air temperature lockout setpoints for heating and cooling; detect instances of simultaneous heating and cooling, detect abnormal fan current (could indicate a broken belt), detect cycling dampers, chilled water temperature reset based on AHU cooling coil valve position; and diagnose leaking or stuck valves. For simplification of illustration, FIG. 6B illustrates only a select number of these points. In the example of FIG. 6B, missing points are shown. For example, the capability to determine the outside air fraction was determined to not be available. Accordingly, BASAT identified this capability would be added if three points were added: mixed air temperature and return air temperature (points associated with the air handler unit building system) as well as outdoor air temperature (a point associated with the ambient environment).

The specific example provided in FIG. 6C shows an output spreadsheet for a cooling plant building system. In the example of FIG. 6C, the predetermined list of possible capabilities includes the capability to detect chilled water supply temperature not tracking setpoint; chiller outlet temperature not tracking setpoint; chilled water supply temperature not following outdoor air reset schedule; chilled water differential pressure not tracking setpoint; chilled water flow not tracking setpoint; chiller refrigerant pressure out of manufacturer range; chiller not running when expected; manual override of chiller pumps not running when expected, manual override of pumps; check if pumps are running while cooling is off; cooling plant requirement not following expected schedule; chiller condenser or evaporator fouling, loop-load optimization available, chilled water supply temperature optimization available, establish chilled water supply temperature outdoor air reset schedule; chiller efficiency tracking; plant total efficiency tracking; determine cooling tower efficiency (gpm/hp), establish condenser water supply temperature control; improve cooling tower fan performance via condenser water return temperature control, tracking cooling tower fan staging and fan speed, implement condenser temperature reset, chilled water pump staging; determine if VFDs should be added to pumps, determine if chiller is performing poorly and if it should be replaced. For simplification of illustration, FIG. 6C illustrates only a select number of these points.

The specific example provided in FIG. 6D shows an output spreadsheet for a heating plant building system. In the example of FIG. 6D, the predetermined list of possible capabilities includes the ability to verify if reset is or can be established on hot water supply temperature, detection of low Delta-T (less than 8° F.), determine if hot water loop differential pressure is constant and if it can be reset at partial load conditions; diagnose boiler system leakage; determine if excess boiler capacity online, with associated efficiency losses (boiler sequencing); verify steam trap performance; diagnose tube cleanliness (predictive maintenance) or over-firing and the ability to diagnose boiler efficiency. For simplification of illustration, FIG. 6D illustrates only a select number of these points. The example of FIG. 6D shows the list of capabilities prior to the user generating results. Accordingly, the true/false indicator field and the list of missing points is currently not completed in FIG. 6D.

The disclosed BASAT provides an output section dedicated to capabilities related to various predefined protocols. Examples of protocols include Building Re-tuning (BRT), Lean Energy Analysis (LEAN), Demand Response (DR), NYC Local Law 87 (LL87) and Fault Detection Diagnostics (FDD). Each such protocol has a corresponding output worksheet which is shown schematically in FIG. 7A. Protocol output sheets have a generate results button 700 as well as one or more capabilities update buttons 702. Actuation of the capability update buttons 702 sends the user to the corresponding capability input page so points for that capability can be altered. Actuation of the generate results button 700 executes computer-implemented logic that determines if the BAS satisfies the predetermined criteria (listed in column 704) associated with the protocol. Section 706 provides a yes/no indication to signify whether or not the predetermined capability is satisfied. If the capability is not satisfied, a list of missing points is provided in column 708. A text box 710 for notes is also present.

FIG. 7B is a specific example of an output section for a LEAN protocol. The predetermined criteria for a LEAN protocol includes temperature control capabilities (a determination as to whether supply air temperature tracks setpoint; detect cooling coil operation during economizer mode, detection of overlap of outside-air temperature lockout setpoints for heating and cooling, determination if significant reheating occurs at the interior zones during unoccupied hours; chilled water temperature reset based on AHU cooling coil valve position, verification if reset is or can be established on hot water supply temperature, chilled water supply temperature not tracking setpoint, chiller outlet temperature is not tracking setpoint; chilled water differential pressure not tracking setpoint, chilled water flow not tracking setpoint); operation schedule capabilities (implement a discharge-air setpoint reset schedule, implement a night setback during unoccupied hours, implementation of nighttime setback/unoccupied mode at the zone level, determine if supply fan cycling occurs frequently during unoccupied hours, verify outside-air damper operation during unoccupied hours, determine if hot water loop differential pressure is constant and if it can be reset at partial load conditions, chiller not running when expected, pumps not running when expected, check if pumps are running while cooling is off, cooling plant equipment not following expected schedule); decrease ventilation capabilities (determine the outside air fraction, determine if sufficient/excessive outside air is being supplied for ventilation, verify static pressure control, determine if minimum outside-air damper position signal is reasonable); systems efficiency (diagnose boiler efficiency, verify steam trap performance, diagnose boiler system leakage, detection of low Delta-T (less than 8° F.); chiller efficiency tracking, chilled water pump staging); air-side economizer (detect deficiencies in economizer mode operation, detect whether outside-air damper is open when outside-air conditions are unfavorable, determine if outside air conditions are favorable for Economizer mode); and envelope capabilities (identify high infiltration, monitor after-hours cool-down). For simplification of illustration, FIG. 7B illustrates only a select number of these points.

FIG. 7C is a specific example of an output section for an LL87 protocol. The predetermined criteria for a LL87 protocol includes temperature, humidity setpoints and setbacks (implement a discharge-air setpoint reset schedule, determine whether supply air temperature tracks setpoint, identify extremely high or low supply air temperatures and setpoints, verify stability of discharge-air temperatures); operating schedules reflect major space occupancy patterns (implement a night setback during unoccupied hours, implementation of nighttime setback/unoccupied mode at the zone level, determine if supply fan cycling occurs frequently during unoccupied hours, verify proper outdoor-air damper operation during unoccupied hours or when the building is in warmup/cool-down mode); appropriate ventilation rate capabilities (determine if sufficient/excessive outside air is being supplied for ventilation, verify outside-air damper operation during unoccupied hours); no unintentional simultaneous heating and cooling capabilities (implementation of nighttime setback/unoccupied mode at the zone level, determine if significant reheating occurs at the interior zones during unoccupied hours, detect overlap of outside-air temperature lockout setpoints for heating and cooling, detect instances of simultaneous heating and cooling); economizer controls function (detect deficiencies in Economizer mode operation, determine if minimum outside-air damper position signal is reasonable, detect whether outside-air damper is open when outside-air conditions are unfavorable, detect cooling coil operation during economizer mode, determine the outside air fraction); HVAC controls and sensor capabilities (change cooling setpoints, change heating setpoints, implement static pressure reset, verify if reset is or can be established on hot water supply temperature, determine if hot water loop differential pressure is constant and if it can be reset at partial load conditions, chilled water supply temperature not tracking setpoint, chiller outlet temperature is not tracking setpoint, chilled water supply temperature not following outdoor air reset schedule, chilled water differential pressure not tracking setpoint); cooling system capabilities (determine if chiller is performing poorly and if it should be replaced); heating system capabilities (diagnose boiler efficiency); and ventilation capabilities (implement demand control ventilation). For simplification of illustration, FIG. 7C illustrates only a select number of these points.

FIG. 7D is a specific example of an output section for a BRT protocol. The "BRT" output section is presented in accordance with the Pacific Northwest National Lab (PNNL) Building Re-tuning protocol. All measures/trends listed in this section match the questions asked in PNNL's Guides to Re-tuning Measures and indicate whether or not the specific trends associated with these questions can be implemented given the points available in the BAS. Each measure is part of a group of measures defined by each of the Guides to Re-tuning Measures. Each group of measures has a cell containing the title of the group and a tooltip (user hovers mouse over the cell and a note appears containing information regarding that specific measure) referring to the specific guide document from which the group of measures originated. This output section works in a similar fashion as other protocol-specific output sections in BASAT; that is, it compares the true or false inputs to a list of measures and determines whether a measure in the list of measures is present or absent based upon predetermined combinations of the true or false inputs. In this section, a "Points to Trend" column is presented instead of the notes/caveats column. The "Points to Trend" column lists the points that the user should trend in order to track, evaluate or investigate each measure. Notes/caveats for each measure are presented in the form of tooltips attached to each cell of the "Points to Trend" column. The notes/caveat tooltip content is derived from PNNL's Guides to Re-tuning Measures. The predetermined criteria for a BRT protocol includes AHU discharge-air temperature control (Is reset being used to control the discharge-air set point?, Is the discharge-air meeting setpoint or do deviations occur?, Are setpoints too high or too low, discharge-air temperature too warm or tool cold, do the discharge-air temperatures remain relatively stable?); AHU heating and cooling control capabilities (Are outdoor-air temperature lock setpoints for heating and cooling reasonable, do they overlap?, Is there simultaneous heating and cooling occurring in the AHU?); AHU minimum outdoor-air operation (Is outdoor air sufficient for ventilation or is over-ventilation occurring?, Does the outdoor-air damper close during unoccupied times?); AHU static pressure control capabilities (Is there a reset-schedule for the duct static pressure?, Determine whether the static pressure setpoint is too high or too low); air-side economizer operation capabilities (How close in the outdoor-air fraction compared to the outdoor-air damper position signal?, Is the minimum outdoor-air damper position signal reasonable (between 10% and 20%)?, Is the outdoor-air damper open when outdoor-air conditions are not favorable (OAT>RAT)?, Is the outdoor-air damper closed or at minimum position when outdoor conditions are favorable for economizing and the AHU is in cooling mode?, Does the cooling coil operate during economizer mode?, Does the cooling oil operate when the OAT is lower than the SAT setpoints?, Do outdoor-air dampers close to minimum position for freeze protection?, Is MAT between the OAT and RAT?, When conditions are not favorable for economizing, is the mixed-air temperature closer to return-air or outdoor-air?); central utility plant cooling control capabilities (Is reset utilized on the chilled water supply temperature?, Is the loop delta-T (CHWRT-CHWST) low?, Is the chilled water loop differential pressure setpoint constant and, if so, can it be reset at partial load conditions?); central utility plant heading control capabilities (Is reset utilized on the hot water supply temperature?, Is the loop delta-T (HWST-HWRT) low?, Is the hot water loop differential pressure constant and, if so, can it be reset at partial load conditions?); occupancy scheduling (is there night setback for unoccupied hours?, Is there a weekend setback if the building is unoccupied on the weekends?, Does the supply fan cycle frequently during unoccupied hours?, Does the outdoor-air damper open during unoccupied hours or when the building is in warmup/cool-down mode?, whole building setback strategies); zone heating and cooling control capabilities (Is there night-time set back/unoccupied mode at the zone level?, Is there significant re-heating occurring at the interior zones?). For simplification of illustration, FIG. 7D illustrates only a select number of these points.

FIG. 7E is a specific example of an output section for a DR protocol. The predetermined criteria for a DR protocol includes HVAC DR control strategies (increase/decrease global or zone temperature setpoints, decrease duct static pressure setpoints, limit or decrease fan variable frequency drive (VFD) speed, increase/decrease supply air temperature setpoints, reduce quantity of fans in operation, heating/cooling valve position limiting/shutoff, chiller demand limiting or demand reduction, increase condenser water temperature, load shedding or lad shifting, shut off one or multiple chiller units, shut off chilled water pump, shut off condenser water pump); lighting DR control strategies (switching off light fixtures when daylight is available, luminaire dimming/multilevel switching); DR level (automatic demand response, semi-automatic demand response, manual demand response, building-directed demand response, utility-directed demand response); and miscellaneous DR control strategies (ramp down EV charges, shut off air compressors, elevator cycling-demand shift, increase refrigeration storage temperatures (food and non-feed preparation kitchen refrigerators), decrease refrigerator compressor cycling frequency at night/unoccupied hours). For simplification of illustration, FIG. 7E illustrates only a select number of these points.

To generate the output section for the DR protocol, additional points needed to be set out that were not part of the previously detailed systems or included in other protocols. A demand response capability sheet is provided (see FIG. 7F) that permits the user to set the points that are specifically associated with a DR protocol. Examples of points associated with the DR protocol include HVAC system points (DX unit temperature setpoint, DX unit status control Supply Fan Speed Control); lighting system points (light fixture control, dimmable ballasts); DR level points (auto demand response signal, pre-programmed DR strategy, demand response enable, DR event notification, direct load control commands, whole building kW demand); and miscellaneous equipment points (refrigerator compressor control, elevator control, EV charger control, air compressor control, refrigerator temperature control). For simplification of illustration, FIG. 7F illustrates only a select number of these points.

FIG. 8 illustrates a "Points Stats" report that summarizes the number of capabilities in each protocol that require each specific data point. This section is composed of logic that counts the number of capabilities that require a specific point which was not available (for which the user selected the "No" radio button next to the point name in the input sections) and displays these quantities in terms of the four existing protocols in the tool (Demand Response, Local Law 87, LEAN and Building Re-tuning). The results in FIG. 8 are presented in tabular form comprising a column listing all the points present in BASAT; a column denoting the building system(s) each point belongs to; four columns (one for each protocol) containing the capability count for each point. This section informs the user about the points that are most desirable for potential upgrades to BAS infrastructure, in order to comply with or fulfill the greatest number of capabilities assessed in BASAT. A list of points is provided in column 8 and the presence or absence of each point is shown column 804 as a true/false indicator. A list of the number of capabilities that have each point as a necessary component is provided in columns 805, 806, 807 and 808. A total of these columns is provided in column 809. The equipment section (e.g. AHU fans, boilers, etc.) is provided in column 810, which permits the user to rapidly identify the equipment section for each point. The user can quickly determine which points could be added and how the addition of each such point would count toward the various protocols. For example, the user may quickly see the addition of a mixed air temperature in the AHU temperature section would result in an additional five capabilities, all associated with the LEAN protocol, being satisfied. The results table allows the user to sort and filter results to determine which point, currently unavailable in the BAS, is used to complete, enable or trend the most and least number of capabilities within each of the BASAT protocol sections. A drop-down list 812 permits the user to select one of the protocols (e.g. BRT) from a list of available protocols. The most needed point for the selected protocol is listed in box 814. Box 816 lists the single point that is the most needed to satisfy the most number of capabilities across all protocols. Box 818 lists the number of points needed to satisfy all of the protocols. A generate results button is actuated to cause the form of FIG. 8 to pull data from the other sections and generate the results.

Examples of points listed in the Point Stat table (column 802) include Chilled Water Coil Valve Position, Heating Coil Valve Position, Chilled Water Coil Valve Position Setpoint, Heating Coil Valve Position Setpoint, Re-Heat Coil Valve Position, Pre-Heat Entering Temperature, Re-Heat Entering Temperature, Re-Heat Leaving Temperature, Pre-Heat Coil Valve Position, Pre-Heat Leaving Temperature, Outside Air Damper Position, Exhaust Air Damper Position, Return Air Damper Position, Supply Fan Status, Duct Static Pressure, Duct Static Pressure Setpoint, Exhaust Air Fan Status, Supply Fan Speed, Air Volume, Return Fan Current, Return Fan Speed, Return Fan Status, Supply Fan Current, Air Filter Pressure Differential, Supply Air Temperature, Return Air Temperature, Mixed Air Temperature, Supply Air Temperature Setpoint, Exhaust Air Temperature, Supply Air Relative Humidity, Outdoor Air Temperature, Outdoor Air Fraction, Outdoor Relative Humidity, Boiler Fuel Input, Boiler Stack Temperature, Boiler Feed Water Flow, Boiler Steam Pressure, Boiler Condensate Return Temperature, Boiler Make-up Water, Boiler Feed Water Flow Rate, Boiler Feed Water Temperature, Boiler Gas Flow Rate, Boiler Combustion Efficiency, Boiler Input Output Efficiency, Boiler Outlet Pressure, Boiler Status, Boiler Steam Flow Rate, Boiler Steam Output, Boiler Supply Temperature, Boiler Supply Temperature Setpoint, Chilled Water Supply Temp., Chilled Water Return Temp., Chilled Water Loop Differential Pressure, Cooling Demand, Chilled Water Flow, Chilled Water Supply Temp. Setpoint, Chilled Water Flow Setpoint, Total Plant Design CHW Flow, Chilled Water Loop Differential Pressure Setpoint, Chilled Water Pump Run Command, Chilled Water Pump Speed, Chilled Water Pump Amps, Chilled Water Pump Status, Cooling Tower Fan Speed, Cooling Tower Fan Run-time, Cooling Tower Fan Power, Cooling Tower Fan Status, Condenser Inlet Water Temp., Condenser Inlet Water Temp. Setpoint, Chiller Run Command, Evaporator Outlet Water Temp., Evaporator Inlet Water Temp., Evaporator Differential Water Pressure, Evaporator Outlet Water Temp. Setpoint, Evaporator Water Flow, Evaporator Refrigerant Pressure, Evaporator Refrigerant Temp., Chiller Power, Chiller Amps, Chiller Part Load Fraction, Chiller Status, Condenser Differential Water Pressure, Condenser Outlet Water Temp., Condenser Outlet Water Temp. Setpoint, Condenser Refrigerant Pressure, Condenser Refrigerant Temp., Condenser Water Flow, Condenser Water Pump Run Command, Condenser Water Pump Amps, Condenser Water Pump Speed, Condenser Water Pump Status, Supply Fan Speed Control, DX Unit Status Control, DX Unit Temperature Setpoint, Auto Demand Response Signal, Pre-Programmed DR Strategy, Whole Building kW Demand, Direct Load Control Commands, DR Event Notification, Demand Response Enable, Light Fixture Control, Dimmable Ballasts, Air Compressor Control, Elevator Control, EV Charger Control, Refrigerator Compressor Control, Refrigerator Temperature Control, Heat Exchanger Return Temperature, Heat Exchanger Status, Heat Exchanger Supply Temperature, Hot Water Supply Temperature, Hot Water Loop Differential Pressure, Hot Water Return Temperature, Hot Water Supply Temperature Setpoint, Hot Water Delta-T (Supply-Return), Hot Water Loop Bypass, Hot Water Loop Differential Pressure Setpoint, Primary Hot Water Pump Current, Primary Hot Water Pump Feedback, Primary Hot Water Pump Flow Rate, Primary Hot Water Pump Frequency, Primary Hot Water Pump Inlet Pressure, Primary Hot Water Pump Outlet Pressure, Primary Hot Water Pump Power Consumption, Primary Hot Water Pump Speed, Primary Hot Water Pump Speed Control, Primary Hot Water Pump Status, Terminal Unit Reheat Valve Position, Zone Temperature, Occupancy Mode, Terminal Unit Damper Position, Zone Temperature Setpoint.

BASAT provides a number of advantages to the BAS industry. Though electronic building automation techniques were being developed as early as the 1950s, the sector has continued to struggle with the non-existent standardization of terminology. A consistent and shared vocabulary for building automation provided by BASAT is very helpful to the building management industry by reducing terminology overlap and confusion therefore simplifying the process. BASAT analyzes the functionality and effectiveness of different, independent BAS points and applies results over different BAS products from any manufacturer, thus benefitting the overall BAS industry. The ability for BASAT to create a shared and common vocabulary for evaluating BAS infrastructure across the BAS stakeholder professions will improve proliferation of BAS integration as it allows all sectors of the market to communicate more effectively.

BASAT provides a number of advantages to BAS owners. The BASAT utilization by owners depends on the selection of BAS features for a building or across the building portfolio. BASAT helps property owners evaluate building automation implementations and upgrades with one tool over several properties. Because properties are developed and acquired at various points in time, the BAS systems will be different throughout the building portfolio. This creates a challenge for owners when attempting to standardize systems in several different buildings. BASAT can analyze all of the properties and their various BAS points providing standardized results for the owner. This standardization would allow the owner to develop building performance improvement plans across their portfolio. Additionally, routine staff training facilitated by BASAT terminology will create more reliable BAS operations.

BASAT provides a number of advantages to BAS consultants. A standard BASAT template gives building performance consultants a common foundation that can be applied over multiple properties. BASAT provides consultants a common platform to analyze separate BAS vendor points.

BASAT provides a number of advantages to BAS vendors. BASAT standardizes and streamlines BAS offerings according to the assessment tool results, as well as provide product information added to the tool to educate the customer about new BAS features. A vendor may use BASAT as a third-party aggregator for the available BAS points that match the need of the building. The functionality is used to reduce the cost of best-in-class systems through a more competitive market demand, while advancing the best BAS technology.

BASAT provides a number of advantages to BAS operators. Even the most advanced BAS will not perform well if the operator has not been trained to implement the BAS features correctly. BASAT can provide a clear and consistent framework for training for common BAS functions over multiple platforms. This allows operators to learn a common naming structure using BASAT which can then be applied to multiple BAS features. In addition, BASAT can be used as a front-end to any number of building efficiency, regulatory and diagnostic protocols and processes, such as commissioning, retro-commissioning, ongoing commissioning, Pacific Northwest National Lab's Building Re-tuning (BRT) protocol, compliance with NYC Local Law 87, LEAN Energy Analysis, demand response and a long list of others.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for identifying shortcomings in a building automation system (BAS), the method comprising steps of:
    selecting a true or false value for each point in a list of predetermined points associated with a building system controlled by a building automation system, the building system being selected from the group consisting of an air handler unit building system, a cooling plant building system and a heating plant building system;
    comparing the selected true or false values to a list of capabilities and determining whether a capability in the list of capabilities is present or absent based upon predetermined combinations of the true or false values;
    displaying the list of capabilities and showing a user a first indicator that is indicative of the presence or absence of the capability in the building automation system as determined during the step of comparing, thereby identifying shortcomings in the building automation system;

wherein the step of displaying also displays one or more missing points for each capability that is determined to be absent, wherein the one or more missing points would render the corresponding capability present if added to the building automation system;

modifying the building automation system to add the one or more missing point, thereby adding the corresponding capability.

2. The method as recited in claim 1, further comprising inputting text into a general building details form that provides general building details.

3. The method as recited in claim 1, further comprising selecting a true or false value for each point in a list of points associated with an ambient environment of the building automation system.

4. The method as recited in claim 3, wherein the list of predetermined points associated with the ambient environment comprises capability to sense outdoor air temperature, sense outdoor relative humidity and outdoor air fraction.

5. The method as recited in claim 1, further comprising selecting a true or false value for each point in a list of predetermined points associated with a zone of the building automation system, wherein the list of predetermined points associated with the zone comprises a capability of sensing terminal unit damper position; sensing terminal unit reheat valve position; sensing zone temperature; sensing zone temperature setpoint and sensing occupancy mode.

6. The method as recited in claim 1, further comprising
comparing the selected true or false values to a list of requirements to satisfy a protocol and determining whether each requirement in the protocol has a satisfied or unsatisfied status based upon predetermined combinations of the true or false values;
displaying the list of requirements and showing the user a second indicator that is indicative of the satisfied or unsatisfied status of each requirement in the building automation system as determined during the step of comparing.

7. The method as recited in claim 1, further comprising:
selecting a true or false value for each point in a list of predetermined points associated with a protocol;
comparing the selected true or false values to a list of requirements to satisfy a protocol and determining whether each requirement in the protocol has a satisfied or unsatisfied status based upon predetermined combinations of the true or false values;
displaying the list of requirements and showing the user a second indicator that is indicative of the satisfied or unsatisfied status of each requirement in the building automation system as determined during the step of comparing.

8. The method as recited in claim 1, further comprising displaying a point statistic report that provides the list of points that is cross-referenced to at least two protocols and the presence or absence of the point in the building automation system, the point statistic report identifying the point that is absent that maximizes compliance with a maximum number of protocols.

9. A method for identifying shortcomings in a building automation system (BAS), the method comprising steps of:
inputting text into a general building details form that provides general building details for a building with a building automation system;
selecting a true or false value for each point from a list of points associated with an ambient environment of the building automation system, wherein the list of predetermined points associated with the ambient environment comprises capability to sense outdoor air temperature, sense outdoor relative humidity and outdoor air fraction;
selecting a true or false value for each point in a list of predetermined points associated with a zone of the building automation system, wherein the list of predetermined points associated with the zone comprises capability to sense terminal unit damper position; sense terminal unit reheat valve position; sense zone temperature, sense zone temperature setpoint and sense occupancy mode;
selecting a true or false value for each point in a list of predetermined points associated with a building system controlled by a building automation system, the building system being selected from the group consisting of an air handler unit building system, a cooling plant building system and a heating plant building system;
comparing the selected true or false values to a list of capabilities and determining whether a capability in the list of capabilities is present or absent based upon predetermined combinations of the true or false values;
displaying the list of capabilities and showing a user a first indicator that is indicative of the presence or absence of the capability in the building automation system as determined during the step of comparing, thereby identifying shortcomings in the building automation system;
wherein the step of displaying also displays one or more missing points for each capability that is determined to be absent, wherein the one or more missing points would render the corresponding capability present if added to the building automation system;
modifying the building automation system to add the one or more missing point, thereby adding the corresponding capability.

10. The method as recited in claim 9, wherein the step of displaying also displays one or more missing points for each capability that is determined to be absent, wherein the one or more missing points would render the corresponding capability present if added to the building automation system.

11. The method as recited in claim 9, further comprising
comparing the selected true or false values to a list of requirements to satisfy a protocol and determining whether each requirement in the protocol has a satisfied or unsatisfied status based upon predetermined combinations of the true or false values;
displaying the list of requirements and showing the user a second indicator that is indicative of the satisfied or unsatisfied status of each requirement in the building automation system as determined during the step of comparing.

12. The method as recited in claim 9, further comprising:
selecting a true or false value for each point in a list of predetermined points associated with a protocol;
comparing the selected true or false values to a list of requirements to satisfy a protocol and determining whether each requirement in the protocol has a satisfied or unsatisfied status based upon predetermined combinations of the true or false values;
displaying the list of requirements and showing the user a second indicator that is indicative of the satisfied or unsatisfied status of each requirement in the building automation system as determined during the step of comparing.

13. The method as recited in claim 9, further comprising displaying a point statistic report that provides the list of points that is cross referenced to at least two protocols and the presence or absence of the point in the building automation system, the point statistic report identifying the point that is absent that maximizes compliance with a maximum number of protocols.

14. A method for identifying shortcomings in a building automation system (BAS), the method comprising steps of:
- selecting a true or false value for each point in a list of predetermined points associated with an air handler building system controlled by a building automation system;
- selecting a true or false value for each point in a list of predetermined points associated with a cooling plant building system controlled by the building automation system;
- selecting a true or false value for each point in a list of predetermined points associated with a heating plant building system controlled by the building automation system;
- comparing the selected true or false values to a list of capabilities and determining whether a capability in the list of capabilities is present or absent based upon predetermined combinations of the true or false values;
- displaying the list of capabilities and showing a user a first indicator that is indicative of the presence or absence of the capability in the building automation system as determined during the step of comparing, thereby identifying shortcomings in the building automation system;
- wherein the step of displaying also displays one or more missing points for each capability that is determined to be absent, wherein the one or more missing points would render the corresponding capability present if added to the building automation system;
- modifying the building automation system to add the one or more missing point, thereby adding the corresponding capability.

* * * * *